Nov. 30, 1948.  A. M. SEARLE  2,454,843
METAL RECTIFIER
Filed Jan. 14, 1944  2 Sheets-Sheet 2
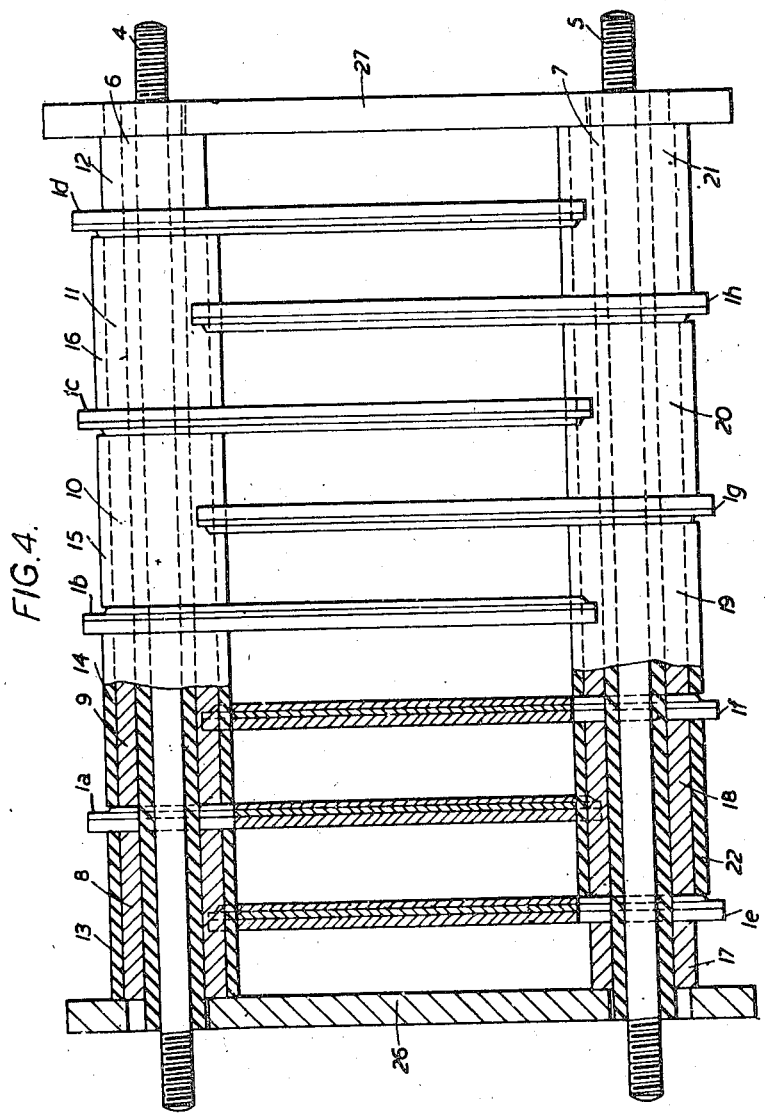
Inventor
Arthur Mackenzie Searle
By
Attorney Patented Nov. 30, 1948

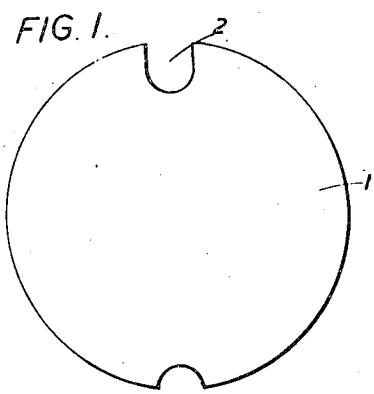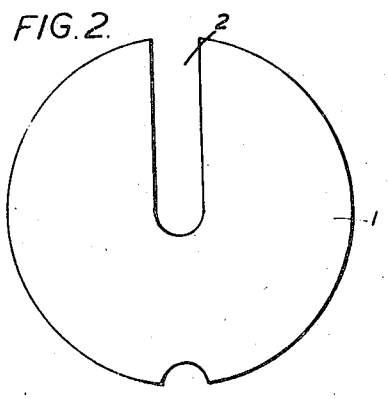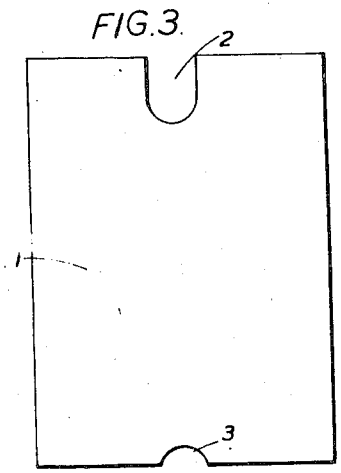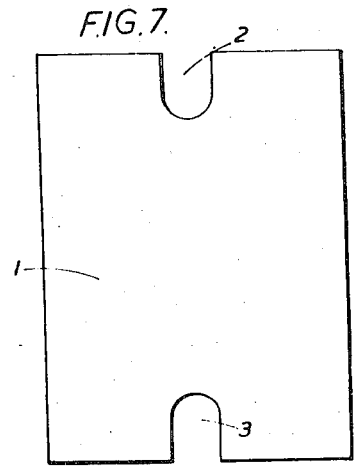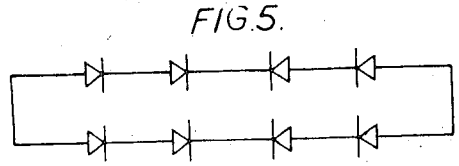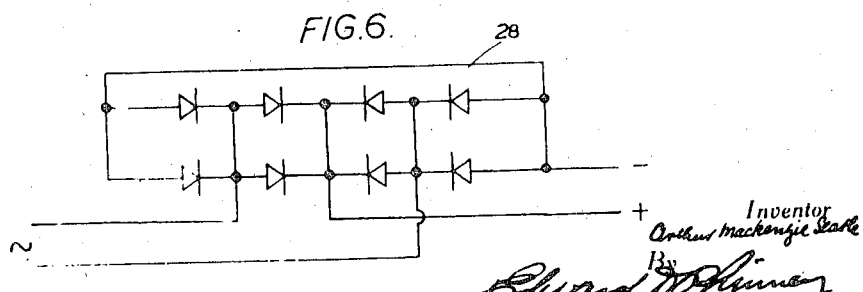

2,454,843

UNITED STATES PATENT OFFICE 2,454,843

METAL RECTIFIER

Arthur Mackenzie Searle, London, England, assignor, by mesne assignments, to International Standard Electric Corporation, New York, N. Y., a corporation of Delaware Application January 14, 1944, Serial No. 518,239
In Great Britain February 4, 1943

3 Claims. (Cl. 175—366)

This invention relates to dry contact metal rectifiers. Such rectifiers are usually made in disc form, either circular or rectangular in shape and are provided with holes by means of which they are threaded on to a rod with the necessary insulators, washers and contact arms to form rectifier assemblies. In the event of a rectifier proving unsatisfactory after such assembly it is necessary to unthread rectifiers, insulators, washers and contact arms in order to remove the faulty rectifier and after replacing it by another to rethread the elements in the correct order.

According to the present invention a rectifier is provided with a slot in its periphery adapted to fit over an assembly rod, and the hole is omitted.

By this means rectifiers may be readily assembled on a rod or rods without threading and a faulty rectifier may be removed from the assembly without needing to unthread any of the elements.

The invention will be better understood from the following description taken in conjunction with the accompanying drawings, Fig. 1 is a face view of a rectifier disc provided with opposed slots;

Figs. 2 and 3 are similar views of modified forms;

Fig. 4 is a side elevation of a rectifier disc assembly;

Fig. 5 is a diagram of the electrical connections of the Fig. 4 assembly;

Fig. 6 is a rectifying circuit employing the Fig. 4 assembly, and

Fig. 7 is a face view of a rectifier disc showing a further modification.

Referring to the drawings Figs. 1 and 2 show circular rectifier discs 1 each provided with a slot 2 according to the invention. In Fig. 1 the slot 2 is just deep enough to take the full diameter of the assembly rod and permit sufficient outward movement of the disc to free the opposite edge thereof. Preferably, however, the slot 2 is made deep enough so that a separating washer on the rod passing through slot 2, may lie wholly against the rectifier disc 1 without protruding. In the case of a circular disc, it is preferable to make the slot 2, as shown in Fig. 2, deep enough to extend to the centre of the disc. Rectifier discs with slots as shown in Fig. 1 or 2 may be assembled on a rod and to remove one of the discs, it is only necessary to slacken the clamping nuts, slide off the faulty rectifier, replace it with a fresh one and retighten the clamping nuts.

Fig. 3 shows a rectangular disc 1 provided with two slots 2 and 3, slot 2 being deep enough to allow of a separating washer lying wholly against the disc 1 and not protruding beyond the periphery thereof, while slot 3 serves merely to steady the disc against a second assembly rod, and is sufficiently shallow to allow of the disc being moved away from this second rod into a position from which it can be removed from the rod in slot 2 without unthreading an assembly mounted on this last mentioned rod.

The slot or slots in a rectifier disc may be provided at any stage of its manufacture. Thus, they may be made in the base plate before the semi-conductor rectifying material is formed thereon or applied thereto, or in the case in which a plurality of discs are to be cut or punched from a larger rectifier sheet, the slots may be cut or punched when the discs are removed from the larger sheet.

Fig. 4 shows one manner in which selenium rectifiers of the kind shown in Fig. 3 may be assembled. Two rods 4 and 5 covered with insulating sleeves 6 and 7 respectively are used. Rectifiers 1a, 1b, 1c, 1d, are placed with the slots 2 embracing insulator 6 on rod 4 and are separated by means of metal spacers 8, 9, 10, 11, 12, covered by insulating sleeves 13, 14, 15, 16, the metal sleeve 12 having no insulating sleeve covering. Rectifiers 1e, 1g, 1f, 1h, are placed with slots 2 embracing insulator 7 on rod 5 and are separated by means of metal spacers 17, 18, 19, 20, 21 covered by insulating sleeves 22, 23, 24, 25, the metal sleeve 17 having no insulating sleeve covering.

The metal spacers are clamped between end plates 26, 27, threaded on both rods and insulators 4, 5, 6, 7, by means of insulating washers and nuts (not shown) so that there are two electrical circuits in parallel, one starting from end plate 26 and passing via metal spacer 8, low resistance direction of rectifier 1a, metal spacer 9, low resistance direction of rectifier 1b, metal spacer 10, high resistance direction of rectifier 1c, metal spacer 11, high resistance direction of rectifier 1d, metal spacer 12, to end plate 27, and the other electrical circuit starting from end plate 26 and passing via metal spacer 17, low resistance direction of rectifier 1e, metal spacer 18, low resistance direction of rectifier 1f, metal spacer 19, high resistance direction of rectifier 1g, metal spacer 20, high resistance direction of rectifier 1h, metal spacer 21 to end plate 27.

The two electrical circuits are shown diagrammatically in Fig. 5. By inserting wiring tags between the metal spacers and the rectifiers, connections as shown in Fig. 6 may be made. Any other desired arrangement of connections may be made by suitably arranging the number and direction of assembly of the rectifiers and the wiring tag connections.

It is not always necessary that the end plates 26, 27 should be insulated from the rods 4, 5. In the particular case described above, insulating sleeves 6 and 7 may be shortened so that end plates 26, 27, both make contact with both rods 4 and 5. The rods 4 and 5 then serve as the connection 28 in Fig. 6.

The slots 3 of rectifiers 1a, 1b, 1c, 1d, fit against sleeves 22, 23, 24, 25, respectively and slots 3 of rectifiers 1e, 1f, 1g, 1h, fit against insulating sleeves 13, 14, 15, 16, respectively.

An alternative form of rectifier disc which may be assembled similarly to the assembly of Fig. 4 is shown in Fig. 7 in which slots 2 and 3 are both large enough to embrace the insulating sleeve 6 or 7. In this case the mounting holes in the end plates 26, 27, through which the rods 4, 5, pass, may be elongated to enable the rods and rectifiers to be separated a short distance when it is necessary to remove a rectifier.

What is claimed is:

1. An assembly of dry contact rectifier discs comprising a series of discs each provided with a pair of longitudinally aligned marginal slots, a first longitudinal assembly member engaging one of the slots of certain of said discs, clamping means on said assembly member conductively interconnecting the discs thus engaged and holding the same in rigidly spaced relationship, a second longitudinal assembly member engaging one of the slots of the remaining discs, clamping means on said second member conductively interconnecting said remaining discs and holding the same in rigidly spaced relationship, means maintaining said two assembly members in spaced parallel relationship, and means for preventing the angular displacement of said discs, said last means including insulating means carried by each of said assembly members and engaging the other slot of each of the discs carried by the opposite member.

2. An assembly of dry contact rectifier discs comprising a series of discs each provided with two longitudinally aligned slots, one relatively shallow and the other relatively deep, a pair of assembly rods, means holding said rods in spaced parallel relationship, a plurality of conductive spacers insulatingly carried on the first rod and conductively interconnecting certain of said discs while holding the same in rigidly spaced relationship along the rod, with the said relatively deep slot thereof straddling said rod, a plurality of conductive spacers insulatingly carried on the second rod and conductively interconnecting the remaining of said discs while holding the same in rigidly spaced relationship along said second rod, with the said relatively deep slot of said remaining discs straddling said second rod, and a plurality of insulating spacers carried by each of said rods and engaging said relatively shallow slot of each disc held by the opposite rod whereby the angular displacement of any of said discs will be prevented.

3. An assembly of dry contact rectifier discs comprising a series of discs each provided with two longitudinally aligned slots, one relatively shallow and the other relatively deep, a pair of assembly rods, means holding said rods in spaced parallel relationship, an insulating sleeve surrounding each of said rods, a plurality of metal spacers surrounding each of said sleeves and being each surrounded in turn by an individual tube of insulating material, except for at most one spacer on each rod, alternate discs being clamped between the said spacers on the first rod and the remaining discs being clamped between the said spacers on the second rod with the said relatively deep slot of each disc straddling the insulating sleeve of the respective rod to which it is clamped, and with the said relatively shallow slot of each disc engaging the periphery of a respective one of said insulating tubes carried by the opposite rod whereby the angular displacement of any of said discs will be prevented.

ARTHUR MACKENZIE SEARLE.

REFERENCES CITED

The following references are of record in the file of this patent:

UNITED STATES PATENTS

| Number | Name | Date |
|---|---|---|
| 898,756 | Lutz | Sept. 15, 1908 |
| 1,250,141 | Chubb | Dec. 18, 1917 |
| 1,373,416 | Everett | Apr. 5, 1921 |
| 1,843,054 | Weinstein | Jan. 26, 1932 |
| 2,018,486 | Cole | Oct. 22, 1935 |
| 2,179,137 | Stevens et al. | Nov. 7, 1939 |
| 2,221,773 | Berman | Nov. 19, 1940 |
| 2,290,304 | Waterman | July 21, 1942 |

FOREIGN PATENTS

| Number | Country | Date |
|---|---|---|
| 318,265 | Great Britain | Dec. 1, 1930 |